United States Patent
Li et al.

(10) Patent No.: US 8,509,241 B2
(45) Date of Patent: *Aug. 13, 2013

(54) METHODS AND SYSTEMS FOR NETWORK ADDRESS TRANSLATION MANAGEMENT

(75) Inventors: Jian Li, San Ramon, CA (US); Raghvendra Savoor, Walnut Creek, CA (US); Zhi Li, Martinez, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/535,971

(22) Filed: Jun. 28, 2012

(65) Prior Publication Data

US 2012/0263037 A1 Oct. 18, 2012

Related U.S. Application Data

(63) Continuation of application No. 11/940,137, filed on Nov. 14, 2007, now Pat. No. 8,233,488.

(60) Provisional application No. 60/972,574, filed on Sep. 14, 2007.

(51) Int. Cl.
*H04L 12/28* (2006.01)
*H04J 3/16* (2006.01)

(52) U.S. Cl.
USPC ...................................... 370/395.31; 370/465

(58) Field of Classification Search
None
See application file for complete search history.

(56) References Cited

U.S. PATENT DOCUMENTS

| | | | |
|---|---|---|---|
| 5,710,885 A | 1/1998 | Bondi | |
| 5,812,814 A | 9/1998 | Sukegawa | |
| 6,650,641 B1 | 11/2003 | Albert et al. | |
| 6,678,242 B1 | 1/2004 | Simon | |
| 6,985,440 B1 | 1/2006 | Albert et al. | |
| 7,002,965 B1 | 2/2006 | Cheriton | |
| 7,280,557 B1 | 10/2007 | Biswas et al. | |
| 7,460,476 B1 | 12/2008 | Morris et al. | |
| 7,586,940 B1 | 9/2009 | Phadnis et al. | |
| 7,633,869 B1 | 12/2009 | Morris et al. | |
| 2001/0037387 A1 | 11/2001 | Gilde et al. | |
| 2002/0141401 A1 | 10/2002 | Albert et al. | |
| 2002/0147019 A1 | 10/2002 | Uhlik et al. | |
| 2003/0126233 A1 | 7/2003 | Bryers et al. | |
| 2003/0236913 A1 | 12/2003 | Hoban et al. | |
| 2003/0236955 A1 | 12/2003 | Cheng et al. | |
| 2005/0022017 A1 | 1/2005 | Maufer et al. | |
| 2005/0210292 A1 | 9/2005 | Adams et al. | |
| 2005/0265382 A1 | 12/2005 | Hartikainen | |
| 2006/0104286 A1 | 5/2006 | Cheriton | |
| 2006/0126613 A1 | 6/2006 | Zweig | |
| 2007/0076702 A1 | 4/2007 | Yang | |
| 2007/0101017 A1 | 5/2007 | Dawson | |

(Continued)

*Primary Examiner* — John Blanton
(74) *Attorney, Agent, or Firm* — Akerman Senterfitt; Michael K. Dixon; Roy Zachariah

(57) ABSTRACT

A computer readable medium includes code to provide network address translation tables. One table includes entries for low priority network traffic and the other table includes entries for high priority network traffic. The code also enforces limits on processor cycles used for maintenance of the tables, receives a packet of a first network traffic type, determines the first packet is low priority traffic based upon the packet being of a first network traffic type, adds an entry to the low priority table, and removes the entry from the low priority table after a first timeout interval and a second entry from the second network address translation table after a second timeout interval.

20 Claims, 7 Drawing Sheets

(56) References Cited

U.S. PATENT DOCUMENTS

| | | |
|---|---|---|
| 2007/0133549 A1 | 6/2007 | Lee et al. |
| 2007/0127407 A1 | 9/2007 | Yuan et al. |
| 2007/0230369 A1 | 10/2007 | McAlpine |
| 2008/0162924 A1 | 7/2008 | Chinitz et al. |
| 2008/0209482 A1 | 8/2008 | Meek et al. |
| 2008/0259852 A1 | 10/2008 | Massiera et al. |
| 2008/0273461 A1 * | 11/2008 | Liang et al. .................. 370/235 |
| 2009/0007123 A1 | 1/2009 | Sreedharan et al. |
| 2009/0073987 A1 | 3/2009 | Li et al. |
| 2010/0165993 A1 | 7/2010 | Basilier |

* cited by examiner

| | Private IP | Private Port | Public IP | Public Port |
|---|---|---|---|---|
| 402 → | 192.168.1.1 | 1256 | 12.2.2.1 | 1385 |
| 402 → | 192.168.1.1 | 1394 | 12.2.2.1 | 1267 |
| 402 → | 192.168.1.2 | 1394 | 12.2.2.1 | 1236 |
| 402 → | 192.168.1.2 | 1716 | 12.2.2.1 | 1652 |

METHODS AND SYSTEMS FOR NETWORK ADDRESS TRANSLATION MANAGEMENT

CROSS REFERENCE TO RELATED APPLICATIONS

This application is a continuation of U.S. patent application Ser. No. 11/940,137, entitled "Methods and Systems for Network Address Translation Management," filed on Nov. 14, 2007, which claims priority to U.S. Provisional Patent Application No. 60/972,574, entitled "Methods and Systems for Network Address Translation Management," filed on Sep. 14, 2007, the disclosures of which are hereby expressly incorporated by reference in their entirety.

FIELD OF THE DISCLOSURE

The present disclosure generally relates to communications networks, and more particularly relates to methods and systems for network address translation management

BACKGROUND

Subscribers receive multiple services, such as voice, video, and data, from a single provider. Often, the services are combined for delivery over a single physical layer, such as twisted pair, coaxial cable, or fiber. As voice and video service has traditionally been provided through a dedicated connection, subscribers expect reliable service and can be intolerant of even minor disruptions such as dropped calls or loss of picture. However, as services such as voice-over-IP (VoIP) or Internet Television (IPTV) are combined with data service, a single point of failure is introduced for the combined services and heavy use of the data service can impact the quality of the voice and video services.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
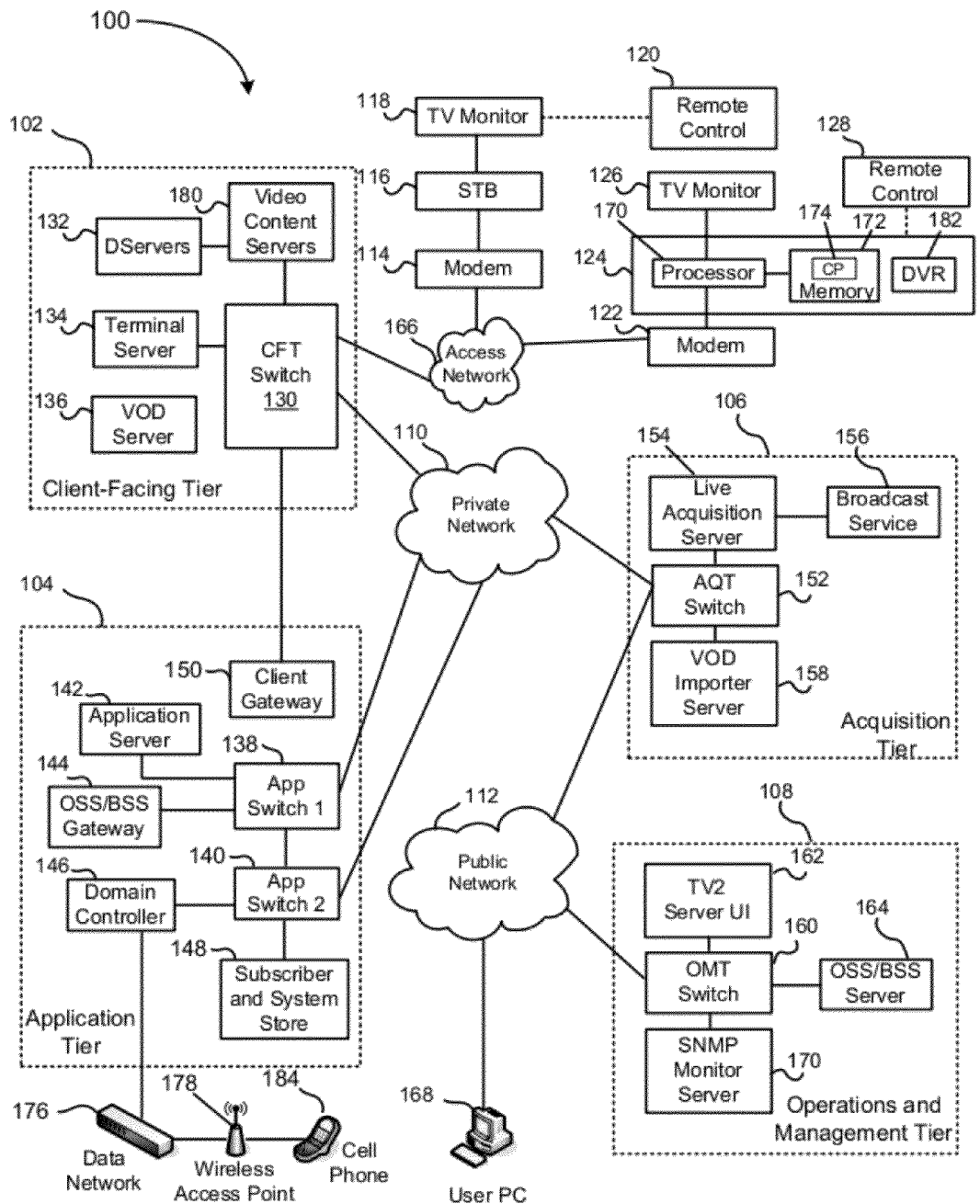
FIG. 1 is a block diagram illustrating an embodiment of an IPTV system.

FIG. 1 shows an IPTV system 100 that can include a client facing tier 102, an application tier 104, an acquisition tier 106, and an operations and management tier 108. Each tier 102, 104, 106, and 108 is coupled to a private network 110, a public network 112, or both the private network 110 and the public network 112. For example, the client-facing tier 102 can be coupled to the private network 110. Further, the application tier 104 can be coupled to the private network 110 and to the public network 112, such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, gateways such as a first residential gateway (RG) 114 and a second RG 122 can be coupled to the private access network 166. The client-facing tier 102 can communicate with a first representative set-top box device (STB) 116 via the first RG 114 and with a second representative set-top box device 124 via the second RG 122. The client-facing tier 102 can communicate with a large number of set-top boxes, such as the representative set-top boxes 116 and 124, over a wide geographic area, such as a regional area, a metropolitan area, a viewing area, or any other suitable geographic area that can be supported by networking the client-facing tier 102 to numerous set-top box devices. In an illustrative embodiment, the client facing tier or any portion thereof can be included at a video head-end office.

In one embodiment, the client-facing tier 102 can be coupled to the RGs 114 and 122 via fiber optic cables. Alternatively, the RGs 114 and 122 can include digital subscriber line (DSL) modems that are coupled to one or more network nodes via twisted pairs, and the client-facing tier 102 can be coupled to the network nodes via fiber-optic cables. Each set-top box device 116 and 124 can process data received through the private access network 166 via an IPTV software platform such as Microsoft® TV IPTV Edition.

Additionally, the first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device 124 can communicate with a second remote control 128. In an exemplary, non-limiting embodiment, each set-top box device 116 and 124 can receive data or video from the client-facing tier 102 via the private access network 166 and render or display the data or video at the display devices 118 and 126 to which it is coupled. In an illustrative embodiment, the set-top box devices 116 and 124 can include tuners that receive and decode television programming information for transmission to the display devices 118 and 126. The television tuner can be National Television System Committee (NTSC) tuner, an Advanced Television System Committee (ATSC), another suitable analog or digital tuner, or any combination thereof. A signal for a television channel can pass through the tuner before the content is displayed on a monitor.

In an exemplary, non-limiting embodiment, STB devices 116 and 124 can receive video content, which may include video and audio portions, from the client-facing tier 102 via the private access network 166. The STB devices 116 and 124 can transmit the video content to an external display device, such as the television monitors 118 and 126. The STB devices 116 and 124 can also communicate commands received from the remote control devices 120 and 128 to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server 168 and other devices with a common connection point to the private network 110. In a particular embodiment, the CFT switch 130 can also be coupled to a video-on-demand (VOD) server 136 that stores or provides VOD content imported by the IPTV system 100. The client-facing tier 102 can also include one or more video content servers 180 that transmit video content requested by viewers via their STB devices 116 and 124. In an illustrative, non-limiting embodiment, the video content servers 180 can include one or more multicast servers.

As shown in FIG. 1, the application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions, such as display, messaging, processing of IPTV data and VOD material, etc. In a particular embodiment, the OSS/BSS gateway 144 includes operation systems and support (OSS) data, as well as billing systems and support (BSS) data.

Further, the second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166, using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the first set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138 to the second APP switch 140, and the second APP switch 140 can communicate the query across the public network 112 to an OSS/BSS server 164. After the client gateway 150 confirms subscriber and/or billing information, the client gateway 150 can allow the first set-top box device 116 access to IPTV content and VOD content. If the client gateway 150 cannot verify subscriber information for the first set-top box device 116, for example because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment during operation of the IPTV system, the live acquisition server 154 can acquire television or movie content. The live acquisition server 154 can transmit the television or movie content to the AQT switch 152, and the AQT switch can transmit the television or movie content to the CFT switch 130 via the private network 110.

Further, the television or movie content can be transmitted to the video content servers 180, where it can be encoded, formatted, stored, or otherwise manipulated and prepared for communication to the STB devices 116 and 124. The CFT switch 130 can communicate the television or movie content to the RGs 114 and 122 via the private access network 166. The STB devices 116 and 124 can receive the television or movie content via the RGs 114 and 122, and can transmit the television or movie content to the television monitors 118 and 126. In an illustrative embodiment, video or audio portions of the television or movie content can be streamed to the STB devices 116 and 124.

Further, the AQT switch can be coupled to a VOD importer server 158 that stores television or movie content received at the acquisition tier 106 and communicates the stored content to the VOD server 136 at the client-facing tier 102 via the private network 110. Additionally, at the acquisition tier 106, the VOD 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When users issue requests for VOD content via the STB devices 116 and 124, the requests can be transmitted over the private access network 166 to the VOD server 136 via the CFT switch 130. Upon receiving such requests, the VOD server 136 can retrieve the requested VOD content and transmit the content to the STB devices 116 and 124 across the private access network 166 via the CFT switch 130. The STB devices 116 and 124 can transmit the VOD content to the television monitors 118 and 126. In an illustrative embodiment, video or audio portions of VOD content can be streamed to the STB devices 116 and 124.

The operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to the OSS/BSS server 164 and to a simple network management protocol (SNMP) monitor 170 that monitors network devices within or coupled to the IPTV system 100. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 can transmit the television or movie content to the AQT switch 152, and the AQT switch 152 in turn can transmit the television content to the CFT switch 130 via the private network 110 or to the OMT switch 160 via the public network 112. Further, the television content can be encoded at the D-servers 132, and the CFT switch 130 can communicate the television content to the RGs 114 and, 122 via the private access network 166. The set-top box devices 116 and 124 can receive the television content from the RGs 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to set-top box devices 116 and 124, the request can be transmitted over the private access network 166 to the VOD server 136 via the CFT switch 130. Upon receiving such a request, the VOD server 136 can retrieve requested VOD content and transmit the content to the set-top box devices 116 and 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer 168 coupled to the public network 112.

The domain controller 146 communicates with the public network 112 via the second APP switch 140. Additionally, the domain controller 146 can communicate via the public network 112 with the personal computer 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices, such as a cellular telephone 184.

In a particular embodiment, a set-top box device such as the second set-top box device 124 can include an STB processor 170 and an STB memory device 172 that is accessible to the STB processor 170. The second set-top box device 124 also includes an STB computer program 174 that is embedded within the STB memory device 172. In a particular embodiment, the STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124, by associating the user account with an IP address of the second set-top box device with data relating to one or more twisted pairs connected with the second set-top box device 124, with data related to one or more fiber optic cables connected with the second set-top box device 124, with an alphanumeric identifier of the second set-top box device 124, with any other data that is suitable for associating second set-top box device 124 with a user account, or with any combination of these.

The STB computer program 174 can contain instructions to receive many types of user preferences from the domain controller 146 via the access network 166. For example, the STB computer program 174 can include instructions to receive a request to record at least one television program at a video content storage module such as a digital video recorder (DVR) 182 within the second set-top box device 124. In this example embodiment, the STB computer program 174 can include instructions to transmit the request to the DVR 182, where the television program(s) are recorded. In an illustrative embodiment, the STB computer program 174 can include instructions to receive from the DVR 182 a recording status with respect to one or more of the television programs and to transmit at least one message regarding the status to a wireless device, such as the cellular telephone 184. The message can be received at the CFT switch 130, for instance, and communicated to the domain controller 146 across the private network 110 via the second APP switch 140. Further, the domain controller 146 can transmit the message to the wireless data network 176, directly or via the public network 112, and on to the wireless network access point 178. The message can then be transmitted to the cellular telephone 184. In an illustrative embodiment, the status can be sent via a wireless access protocol (WAP).

Figure 2:
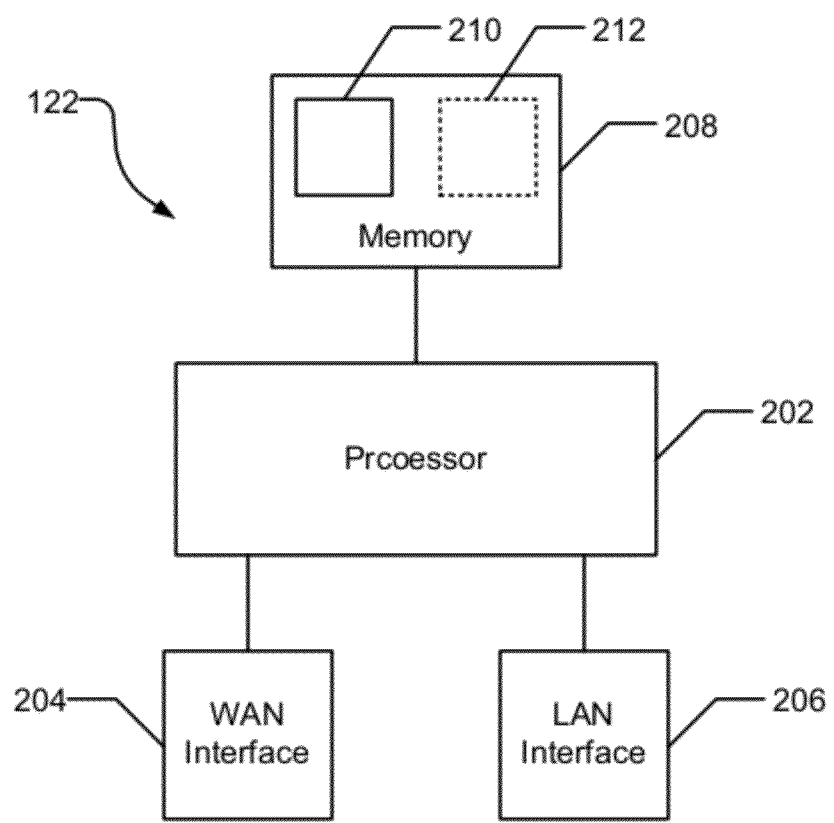
FIG. 2 is a block diagram illustrating an exemplary residential gateway (RG)

FIG. 2 shows the RG 122 in greater detail. The RG 122 can have a processor 202, a WAN interface 204, a LAN interface 206, and a memory 208. The memory 208 can include memory module 210, and can be expanded by adding an additional memory module 212. The WAN interface 204 can connect to a network provider such as through a coax cable, a twisted pair, a fiber optic cable, or a wireless link. LAN devices, such as the STB 124, a computer, or voice-over-IP (VoIP) telephones, can connect to the LAN interface 206 such as through a coax cable, a twisted pair, a fiber optic cable, or a wireless link. The RG 122 can provide network services to the LAN devices, such as firewall services, routing services, dynamic host configuration protocol (DHCP) services, network address translation (NAT) services, and domain name system (DNS) services. Additionally, the RG 122 can provide quality of service (QoS) functions to minimize jitter, latency, and packet loss, to high priority network traffic such as VoIP traffic and IPTV traffic. For example, the RG 122 may guarantee availability of certain resources to high priority traffic.

In an exemplary embodiment, the RG 122 may include trouble detection and isolation systems. The processor 202 can monitor resource utilization, such as memory utilization, CPU utilization, and bandwidth utilization. Additionally, the processor 202 can monitor other service parameters, such as NAT table utilization, routing table utilization, and firewall table utilization. Based on the monitoring of resource utilization, the processor 202 may predict over-utilization of a resource. Over-utilization of a resource may prevent the RG 122 from providing QoS to high priority traffic. When the processor 202 predicts over-utilization of a resource, the processor may log the event, send an alert, or reduce resource utilization by low priority traffic, such as by limiting network connections or flushing entries from the NAT table.

Figure 3:
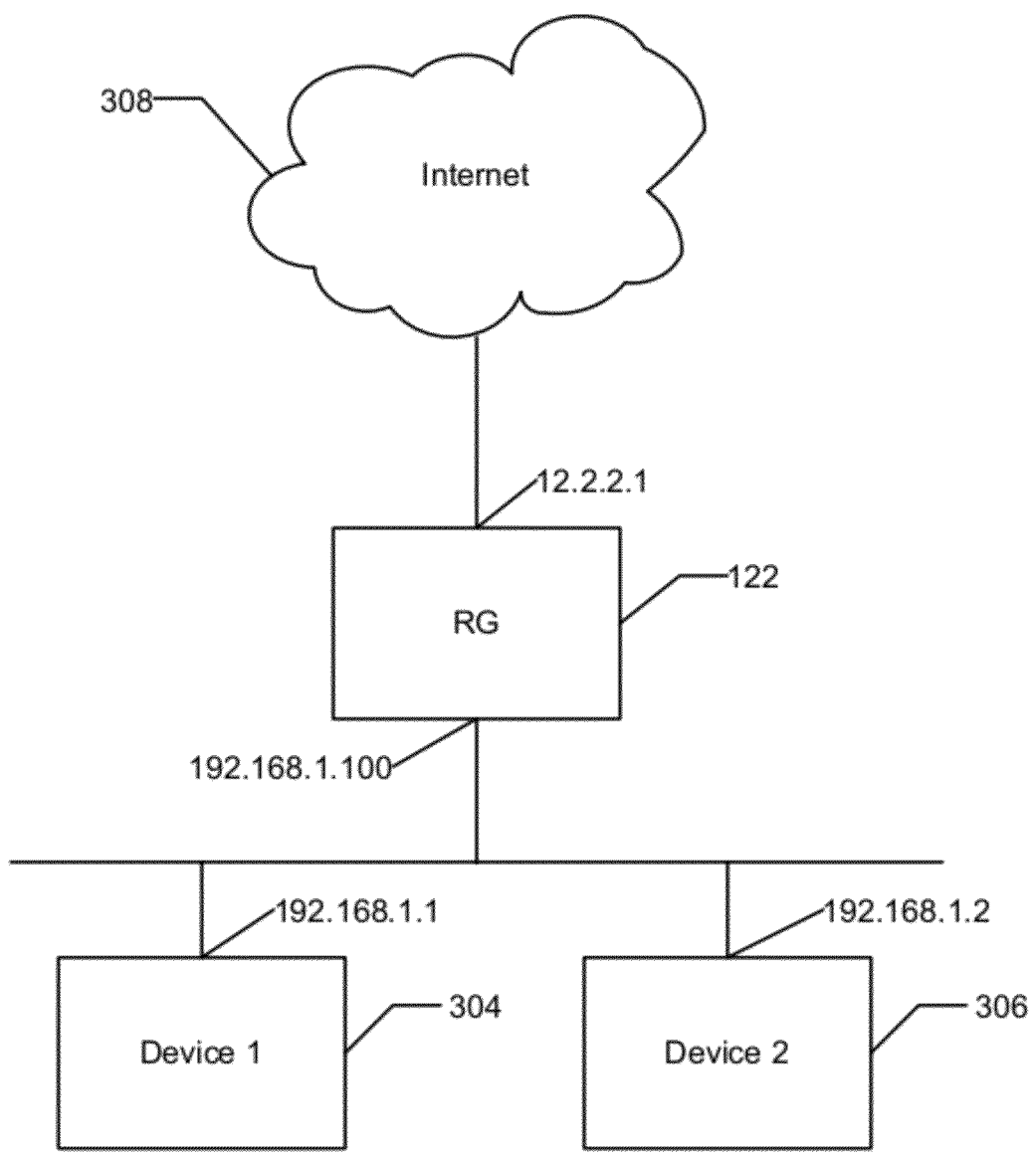
FIG. 3 is an exemplary embodiment of a network utilizing network address translation (NAT)
Figures 4, 5:
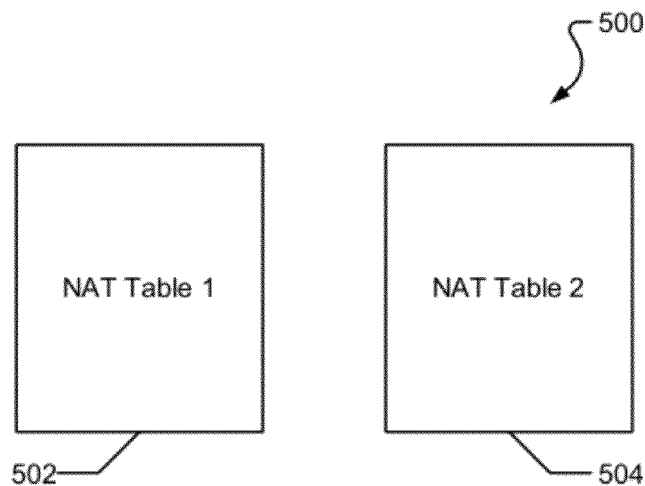
FIG. 4 is an exemplary embodiment of a NAT table.
FIG. 5 is a block diagram illustrating multiple NAT tables.

FIGS. 3 and 4 illustrate an exemplary embodiment of a NAT. The RG 122 can connect LAN devices 304 and 306 to the Internet 308. The RG 122 has a public IP address of 12.2.2.1 and a private IP address of 192.168.1.100. Device 304 can have a private IP address of 192.168.1.1 and device 306 can have a private IP address of 192.168.1.2. A public IP address can be routable from the Internet 308, whereas a private IP address may not be routable from the Internet. The NAT provided by RG 122 allows devices 304 and 306 to utilize the public IP address of the RG 122 when communicating with the Internet 308.

When device 304 sends a request to the Internet 308, RG 122 can replace the source address, i.e. the private IP address of device 304, with the public IP address of RG 122. Additionally, the RG 122 may replace the source port of device 304 with a NAT port of the RG. A reply can be sent to the public IP address and the NAT port of the RG 122. The RG 122 can replace the destination IP address, i.e. the public address of the RG, with the private IP address of device 304. Additionally, the RG 122 can replace the destination port, (i.e. the NAT port of the RG), with the port of device 304. The RG 122 can then forward the reply to the device 304.

The RG 122 can store NAT information in a NAT table, such as exemplary NAT table 400. The NAT table 400 stores information for a plurality of connections 402. For each connection 402, the NAT table 400 includes the private IP address 404 of devices 304 or 306, the port 406 for device 304 or 306, the public IP address 408 of the RG 122, and the port 410 of the RG 122.

In an alternate embodiment, the NAT table can also include the public IP address and the port of an Internet device, such as a web server. The RG 122 can use the address and port information of the Internet device to further identify a connection between a devices 304 or 306 and an Internet device. When storing the address and port information of the Internet device, a port of the RG 122 can be used for more than one connection.

In an exemplary embodiment, the size of the NAT table is fixed. NAT table overflow can occur when all available space in the NAT table is in use. Until entries in the NAT table are removed, such as when the entries expire or when the NAT table is purged, additional entries can not be added. When NAT table overflow occurs, network connections may be dropped, such as when the entry expires and cannot be restored, or additional network connections may be prevented.

FIG. 5 is a block diagram, generally designated 500, illustrating the use of multiple NAT tables 502 and 504. NAT table 502 may be designated for high priority traffic, such as VoIP or IPTV traffic. NAT table 504 may be designated for low priority traffic, such as general traffic. Additional NAT tables may be used to further distinguish traffic, such as separate NAT tables for P2P traffic and web traffic. Multiple NAT tables can isolate NAT table overflow of one class of service. That is, when NAT table 504 overflows, NAT table 502 may still have available space and high priority traffic may remain unaffected by the overflow of NAT table 504.

VoIP and IPTV traffic may utilize a relatively small number of network connections for a relatively long period of time, such that there is a low turnover in network connections. P2P applications, such as BitTorrent, may initiate a relatively large number of connections, many of which may never be utilized. For example, a BitTorrent client may attempt to contact hundreds of peers to find a new peer to establish an active connection. Each attempt can require a NAT table entry, but only the connection to the new peer is utilized for downloading. Consequently, it may be desirable for NAT tables 502 and 504 to have different sizes and timeout values. For example, NAT table 502 can be relatively small and have a relatively long timeout, whereas NAT table 504 can be relatively large and have a relatively short timeout to allow for the large number of BitTorrent connection attempts and to facilitate the rapid removal of partially established connections caused by BitTorrent seeking new peers.

Additionally, multiple NAT tables 502 and 504 can be used to provide aspects of QoS for high priority traffic. For example, system resources may be allocated based on the NAT tables 502 and 504, such as higher priority may be given for packets utilizing NAT table 502. In an exemplary embodiment, upload bandwidth may be heavily utilized. Outgoing traffic may be queued. High priority traffic associated with NAT table 502 can be queued separately from low priority traffic associated with NAT table 504. The high priority queue may be served faster than the low priority queue. For example, two packets from the high priority queue may be served for each packet from the low priority queue. Alternatively, bandwidth may be allocated based on the NAT tables, such as high priority traffic associated with NAT table 502 may be guaranteed a first amount of bandwidth and low priority traffic associated with NAT table 504 may be guaranteed a second amount of bandwidth. If the high priority traffic is not fully utilizing the first amount of bandwidth, low priority traffic may be allowed to temporarily exceed the second amount of bandwidth.

Further, hardware resource allocation, such as CPU cycles or memory, can be based on the priority of the NAT table. For example, CPU cycles used by NAT table 504 may be limited to a small percentage of CPU cycles, whereas CPU cycles used for processing NAT table 502 may be unlimited or limited to a high percentage of CPU cycles. Specifically, CPU cycles are used during insertion of new entries, removal of expired entries, and searching for existing entries. Additionally, the NAT table may periodically undergo maintenance to speed access, such as reclaiming unused space or reorganizing and sorting the entries to improve searching. Such tasks may be limited to a certain percentage of CPU cycles for lower priority NAT tables, such as NAT table 504. Alternatively, the RG 122 may limit NAT table maintenance tasks once a certain threshold is reached. For example, maintenance tasks for NAT table 504 may be stopped once CPU utilization exceeds a certain threshold, such as 85% CPU utilization.

In an alternate embodiment, one NAT table can be used and entries in the NAT table can be assigned different priorities and related attributes such as timeout period based on the type of traffic. For example, VoIP traffic may be assigned a high priority and a relatively long timeout period and P2P traffic may be assigned a low priority and a relatively short timeout period. Additionally, the RG 122 may limit the number of entries for a given type of traffic or a given priority level. Alternatively, the RG 122 may limit entries for a given type of traffic at a percent capacity of the NAT table. For example, the number of NAT entries related to P2P traffic can be limited such that no more entries for P2P traffic may be added when the NAT table is greater than about 70% utilized, whereas entries for VoIP traffic may be added until the NAT table is about 100% utilized.

Figure 6:
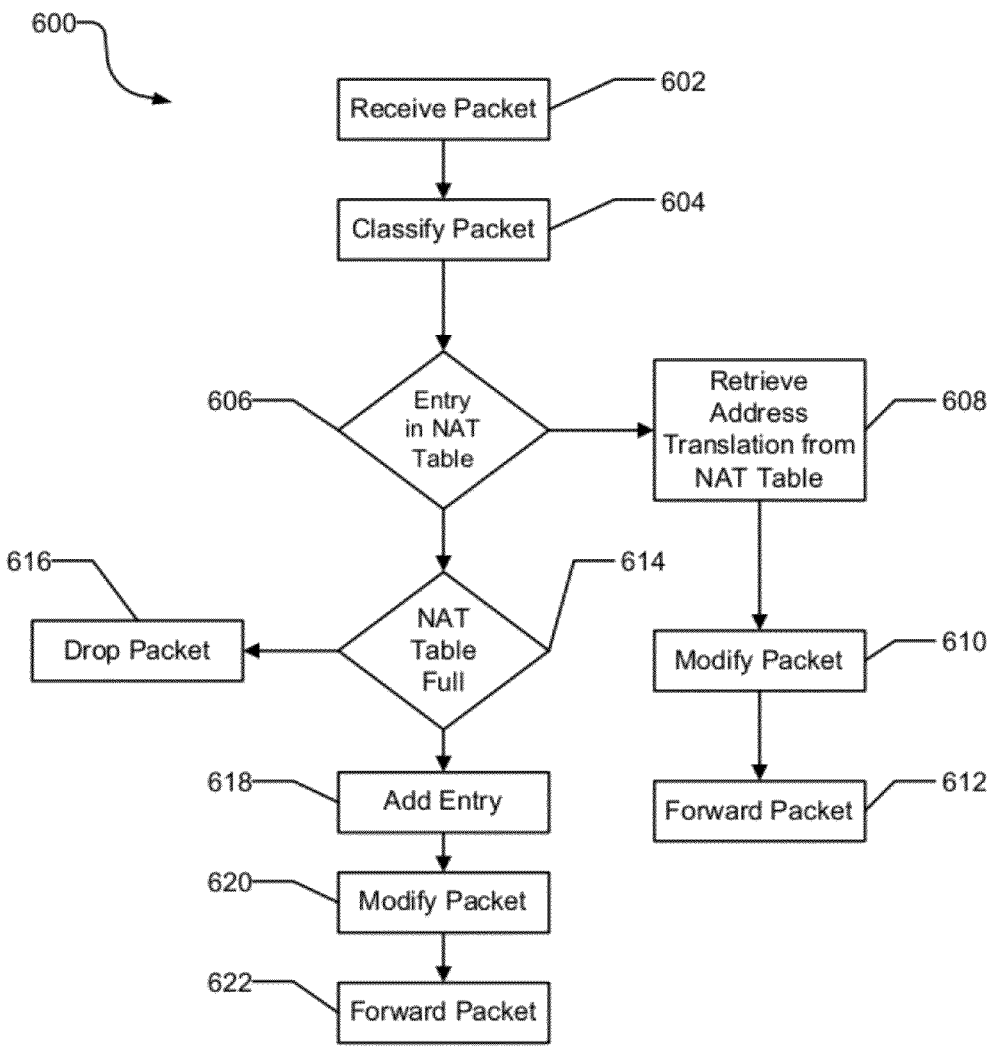
FIG. 6 is a flow diagram illustrating an exemplary method of using multiple NAT tables.

FIG. 6 is a flow diagram illustrating an exemplary method of using multiple NAT tables, generally designated 600. At 602, the RG 122 receives a packet. The packet may be an inbound packet, from the public network to the private network, or an outbound packet, from the private network to the public network. At 604, the packet is classified and the NAT table to which the packet belongs is determined. Typically, the classification can be based on the IP addresses and port numbers. For example, a packet from Video Content Servers 180 to STB 116 can be IPTV traffic and may be associated with the NAT table for IPTV traffic. At 606, the RG 122 can determine if a corresponding entry in the associated NAT table. When the corresponding entry is in the associated NAT table, the RG 122 retrieves the address translation information from the associated NAT table. The address translation information includes the mapping of the public IP to the private IP and the public port to the private port. At 610, the RG 122 modifies the packet based on the entry in the associated NAT table. For outbound traffic, the RG 122 can replace the private IP and private port with the corresponding public IP and the public port. For inbound traffic, the RG 122 can replace the public IP and the public port with the corresponding private IP and private port. The RG 122 can forward the packet to the appropriate network, as illustrated at 612. For outbound traffic, the packet is forwarded to the public network, while for inbound traffic the packet is forwarded to the private network.

Alternatively, at 606, when a corresponding entry is not in the associated NAT table, the RG 122 can determine if the NAT table is full, as illustrate at 614. When the NAT table is full, the packet is dropped at 616. Alternatively, when the NAT table has available space, the RG 122 adds an entry to the NAT table, at 618. The entry in the NAT table includes the mapping of the public IP to the private IP and the public port to the private port. At 620, the RG 122 modifies the packet based on the entry in the associated NAT table. For outbound traffic, the RG 122 can replace the private IP and private port with the corresponding public IP and the public port. For inbound traffic, the RG 122 can replace the public IP and the public port with the corresponding private IP and private port. The RG 122 can forward the packet to the appropriate network, as illustrated at 622.

Figure 7:
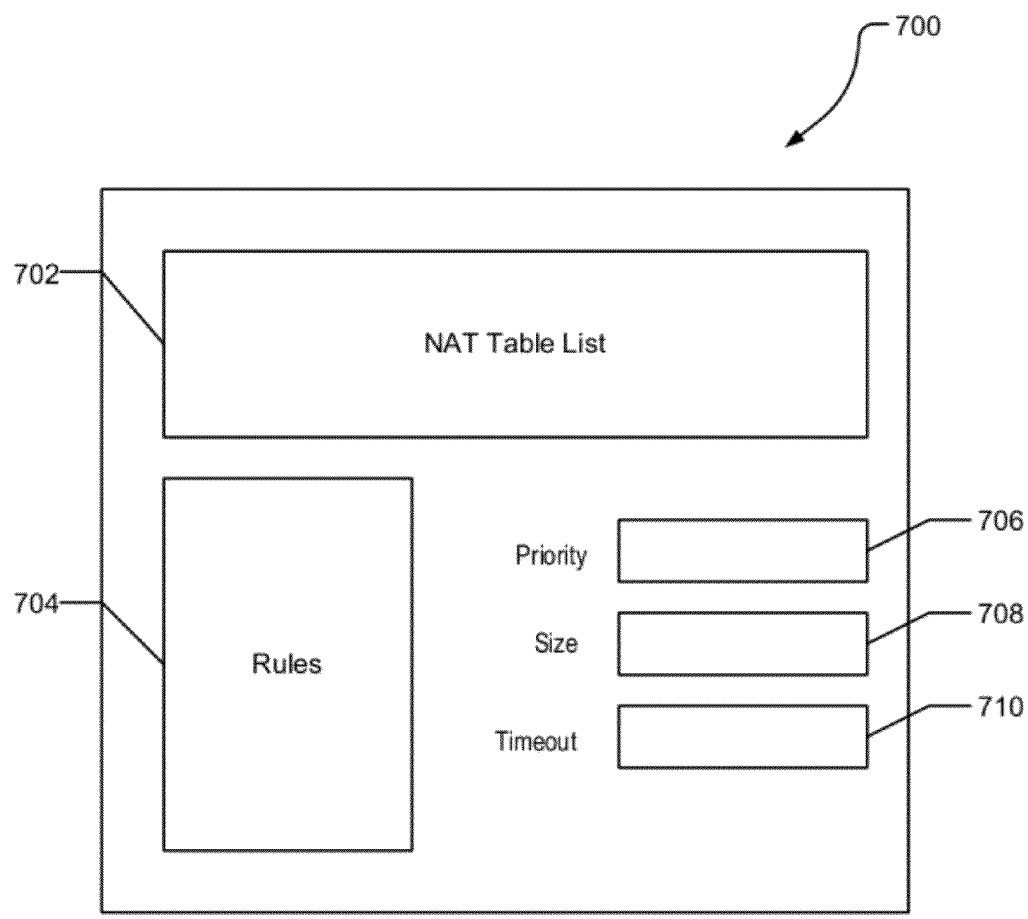
FIG. 7 is a block diagram illustrating an exemplary interface for configuring a RG having multiple NAT tables.

FIG. 7 is a block diagram illustrating an exemplary interface 700 for configuring multiple NAT tables. Interface 700 can include a NAT Table List 702. The NAT Table List 702 can show a list of NAT Tables currently configured. Additionally, NAT Table List 702 can be used to add new NAT Tables. Interface 700 also includes a Rules List 704. The Rules Lists can show the rules associated with a selected NAT table. The rules can be based on packet header information, such as IP addresses and ports. For example, connections to Video Content Servers 180 and VOD Server 136 may be identified based on the IP address of the Video Content Servers 180 and the VOD Server 136. Alternatively, ports used for IPTV or VoIP can be used to identify IPTV and VoIP traffic. Additional information may be used to identify P2P traffic since P2P traffic can use random ports and a rapidly changing list of peers. Interface 700 can include priority selector 706, table size selector 708 and entry timeout selector 710. Priority selector 706, table size selector 708 and entry timeout selector 710 may be implemented as pull down menus, text fields, or other interface elements. Priority selector 706 may be used to select the priority of the traffic associated with a selected NAT table. Table size selector 708 may be used to select the maximum size of a selected NAT table. Entry timeout selector 710 may be used to select the timeout period for a selected NAT table. Interface 700 may also include a button to initiate a refresh of one or more NAT tables. The refresh may delete all entries in the NAT table. Deleting the entries may be useful for recovering from a NAT table overflow.

A service provider may preconfigure certain NAT tables, such as for VoIP or IPTV traffic. The service provider may provide an initial set of parameters, such as the rules, the priority, the size and the timeout period. In an exemplary embodiment, the parameters of service provider configured NAT tables may be locked. Alternatively, the user may change the parameters. The user may also add additional NAT tables and adjust the parameters of user added NAT tables. In an exemplary embodiment, the service provider NAT tables may be set to a higher priority than the user configured NAT tables. For example, the highest priority levels may only be available for service provider configured NAT tables.

Figure 8:
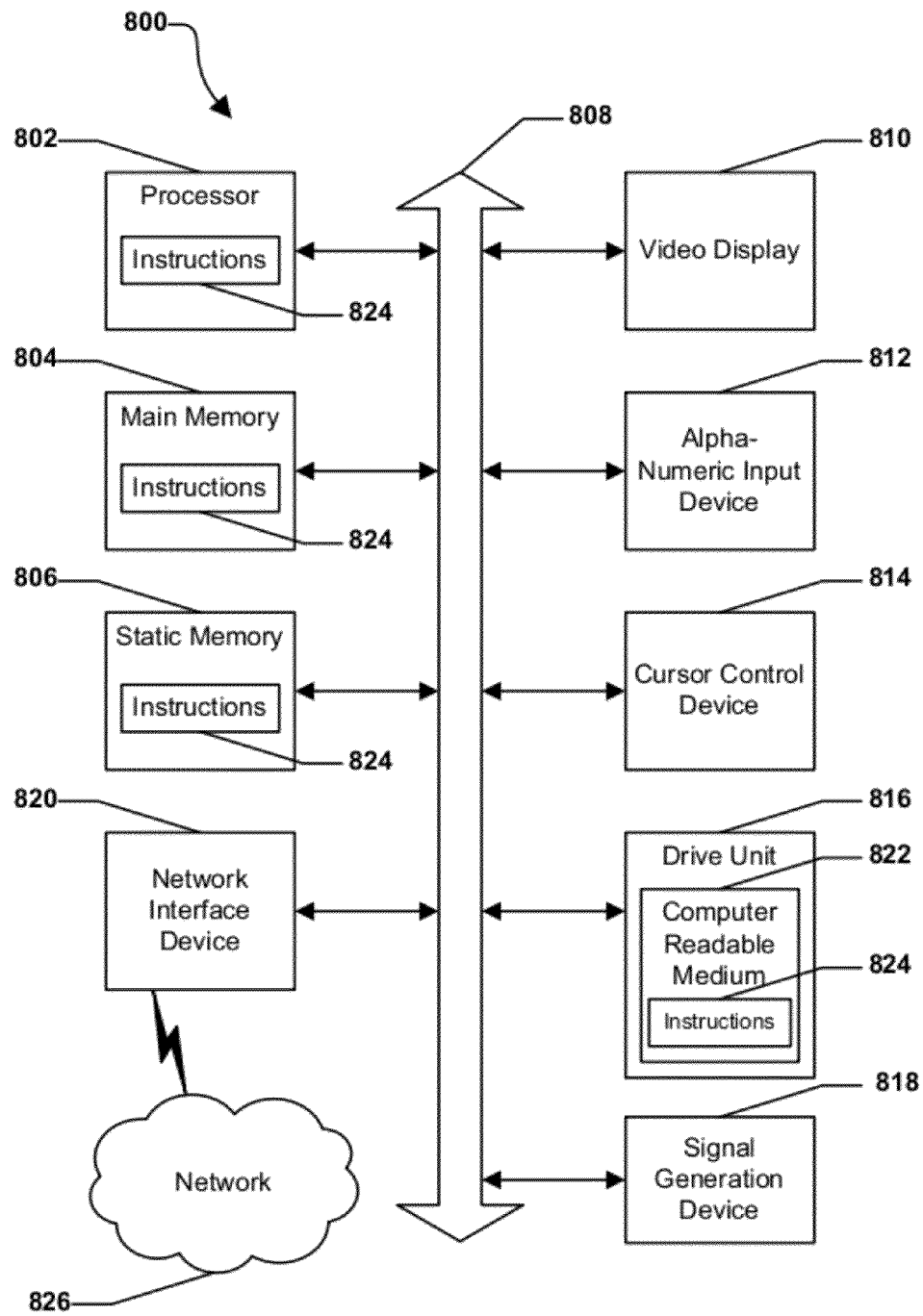
FIG. 8 is an illustrative embodiment of a general computer system.

FIG. 8 shows an illustrative embodiment of a general computer system 800. The computer system 800 can include a set of instructions that can be executed to cause the computer system 800 to perform any one or more of the methods or computer based functions disclosed herein. The computer system 800 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802, such as a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810 such as a liquid crystal display (LCD), an organic light emitting diode (OLED), a flat panel display, a solid state display, or a cathode ray tube (CRT). Additionally, the computer system 800 may include an input device 812 such as a keyboard, and a cursor control device 814 such as a mouse. The computer system 800 can also include a disk drive unit 816, a signal generation device 818 such as a speaker or remote control, and a network interface device 820 to communicate with a network 826. In a particular embodiment, the disk drive unit 816 may include a computer-readable medium 822 in which one or more sets of instructions 824, such as software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A computer readable device including code executable to perform a method, the method comprising:

providing a first network address translation table and a second network address translation table, the first and second network address translation tables both including entries for network traffic between a public network and a private network and associated with a public Internet Protocol address, the first network address translation table including entries for a low priority subset of the network traffic between a public network and a private network and the second network address translation table including entries for a high priority subset of the network traffic between the public network and the private network;

enforcing a first limit on the number of processor cycles used for maintenance of the first network address translation table and a second limit on the number of processor cycles used for maintenance of the second network address translation table;

receiving a first network packet of a first network traffic type;

determining the first network packet corresponds to the low priority network traffic based upon the first network packet being of the first network traffic type;

adding a first entry to the first network address translation table; and removing the first entry from the first network address translation table after a first timeout interval and removing the second entry from the second network address translation table after a second timeout interval.

2. The computer readable device of claim 1, the method further comprising:

limiting the first network address translation table to a predefined size.

3. The computer readable device of claim 2, the method further comprising:

providing an interface for changing the predefined size and for altering at least one of the first timeout interval and the second timeout interval.

4. The computer readable device of claim 1, the method further comprising:

limiting the low priority network traffic to a predefined packet rate.

5. The computer readable device of claim 1, the method further comprising:

limiting the low priority network traffic to a first portion of a bandwidth to guarantee a predefined second portion of the bandwidth is available to high priority network traffic.

6. The computer readable device of claim 1, the method further comprising:

receiving a second network packet;

determining the second network packet corresponds to the high priority network traffic; and adding a second entry to the second network address translation table.

7. The computer readable device of claim 1, the method further comprising:

receiving a third network packet;

determining the third network packet corresponds to the low priority network traffic;

and retrieving a third entry from the first network address translation table.

8. The computer readable device of claim 1, wherein the first entry includes an address and a port of a first device on the private network, an address and a port of a second device on the public network, and an address and a port of a gateway.

9. A computer readable device including code executable to perform a method for network address translation, the method comprising:

provide a network address translation table, the network address translation table including plurality of entries for network traffic between a public network and a private network, a first portion of the plurality of entries including a type designation corresponding to low priority network traffic and a second portion of the plurality of entries including a type designation corresponding to high priority network traffic;

enforcing a first limit on the number of processor cycles used for maintenance of the first portion and a second limit on the number of processor cycles used for maintenance of the second portion, wherein enforcing the first limit and the second limit is in response to a processor utilization exceeding a threshold;

receiving a first network packet of a first network traffic type;

determining the first network packet corresponds to the low priority network traffic when the first network packet is of the first network traffic type;

adding a first entry to the network address translation table, the entry including a type designation corresponding to the low priority network traffic and a first timeout interval having a first initial duration;

receiving a second network packet of a second network traffic type;

determining the second network packet corresponds to the high priority network traffic when the second network packet is of the second network traffic type; and adding a second entry to the network address translation table, the entry including a type designation corresponding to the high priority network traffic and a second timeout interval having a second initial duration, wherein the first initial duration is different than the second initial duration.

10. The computer readable device of claim 9, the method further comprising:

limiting the first portion to a predefined size.

11. The computer readable device of claim 10, the method further comprising: providing an interface for changing the predefined size.

12. The computer readable device of claim 9, the method further comprising:

limiting the low priority network traffic to a predefined packet rate.

13. The computer readable device of claim 9, the method further comprising:

limiting the low priority network traffic to a first bandwidth to guarantee a predefined second bandwidth is available to the high priority network traffic.

14. The computer readable device of claim 9, the method further comprising:

removing the first entry after the first timeout interval and removing the second entry after the second timeout interval.

15. The computer readable device of claim 9, the method further comprising:

receiving a third network packet;

determining the third network packet corresponds to the low priority network traffic; and retrieving a third entry from the first network address translation table.

16. The computer readable device of claim 9, wherein the first entry includes an address and a port of a first device on the private network, an address and a port of a second device on the public network, and an address and a port of a gateway.

17. A gateway comprising:

a memory comprising:

a first network address translation table and a second network address translation table, the first and second network address translation tables both including entries for network traffic between a public network and a private network and associated with a public Internet Protocol address, the first network address translation table including entries for a low priority subset of the network traffic between a public network and a private network and the second network address translation table including entries for a high priority subset of the network traffic between the public network and the private network;

an interface operable to configure the first and second network address translation tables, the interface including a priority selector to set a low priority level for the first network address translation table and a high priority level for the second network address translation table; and a processor that performs operations comprising:

enforcing a first limit on the number of processor cycles used for maintenance of the first network address translation table and a second limit on the number of processor cycles used for maintenance of the second network address translation table in response to a processor utilization exceeding a threshold;

receiving a first network packet of a first network traffic type;

determining the first network packet corresponds to the low priority network traffic based upon the first network packet being of the first network traffic type; and adding a first entry to the first network address translation table.

18. The gateway of claim 17, wherein the processor further performs operations comprising limiting the low priority network traffic to a predefined packet rate.

19. The gateway of claim 17, wherein the processor further performs operations comprising limiting the low priority network traffic to a first portion of a bandwidth to guarantee a predefined second portion of the bandwidth is available to the high priority network traffic.

20. The gateway of claim 17, wherein the processor further performs operations comprising:

receiving a second network packet;

determining that the second network packet corresponds to the high priority network traffic; and adding a second entry to the second network address translation table.

* * * * *